July 22, 1930.　　　J. V. MARTIN　　　1,770,937
AIRCRAFT SAFETY MOTOR
Filed July 1, 1924　　3 Sheets-Sheet 1

INVENTOR

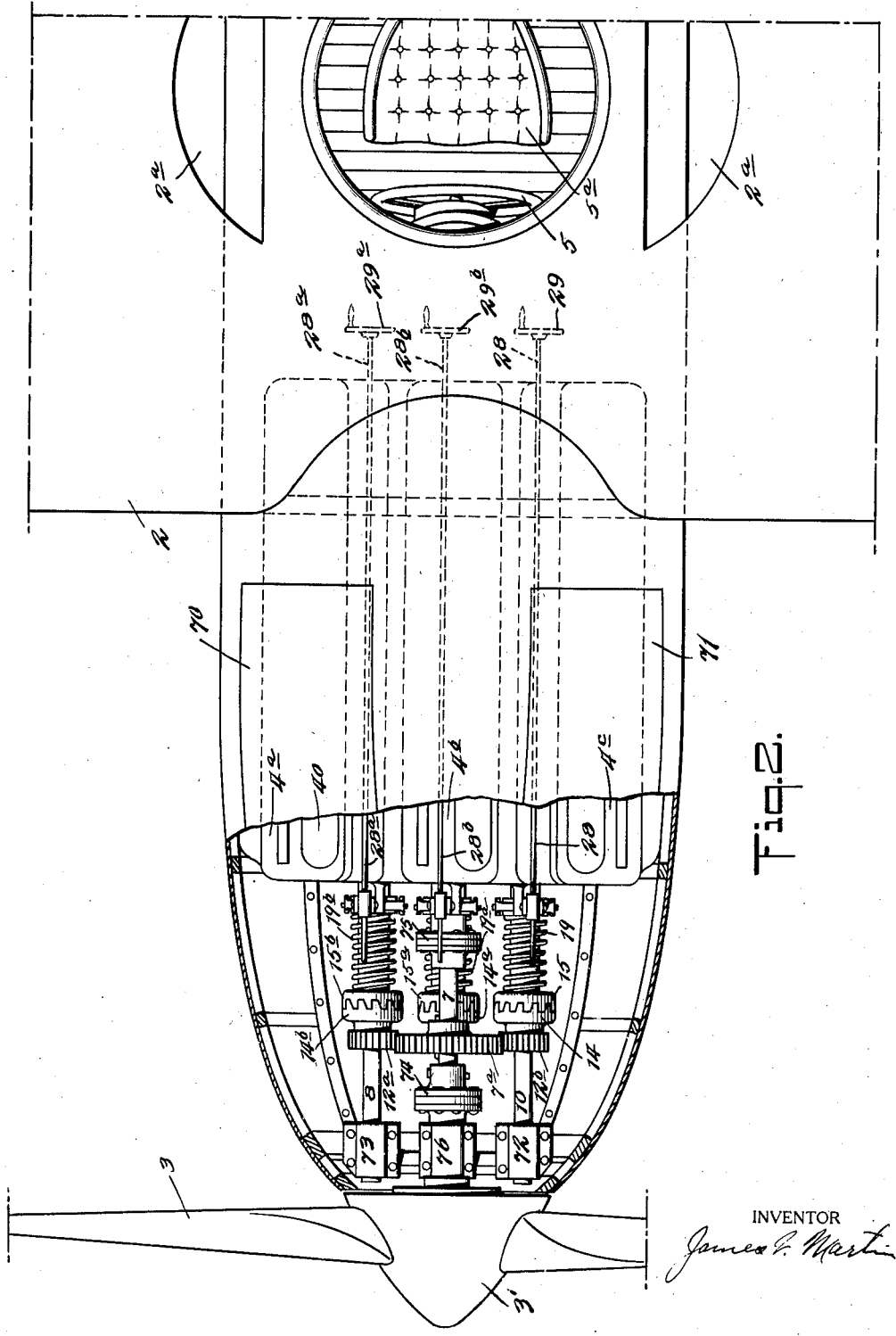

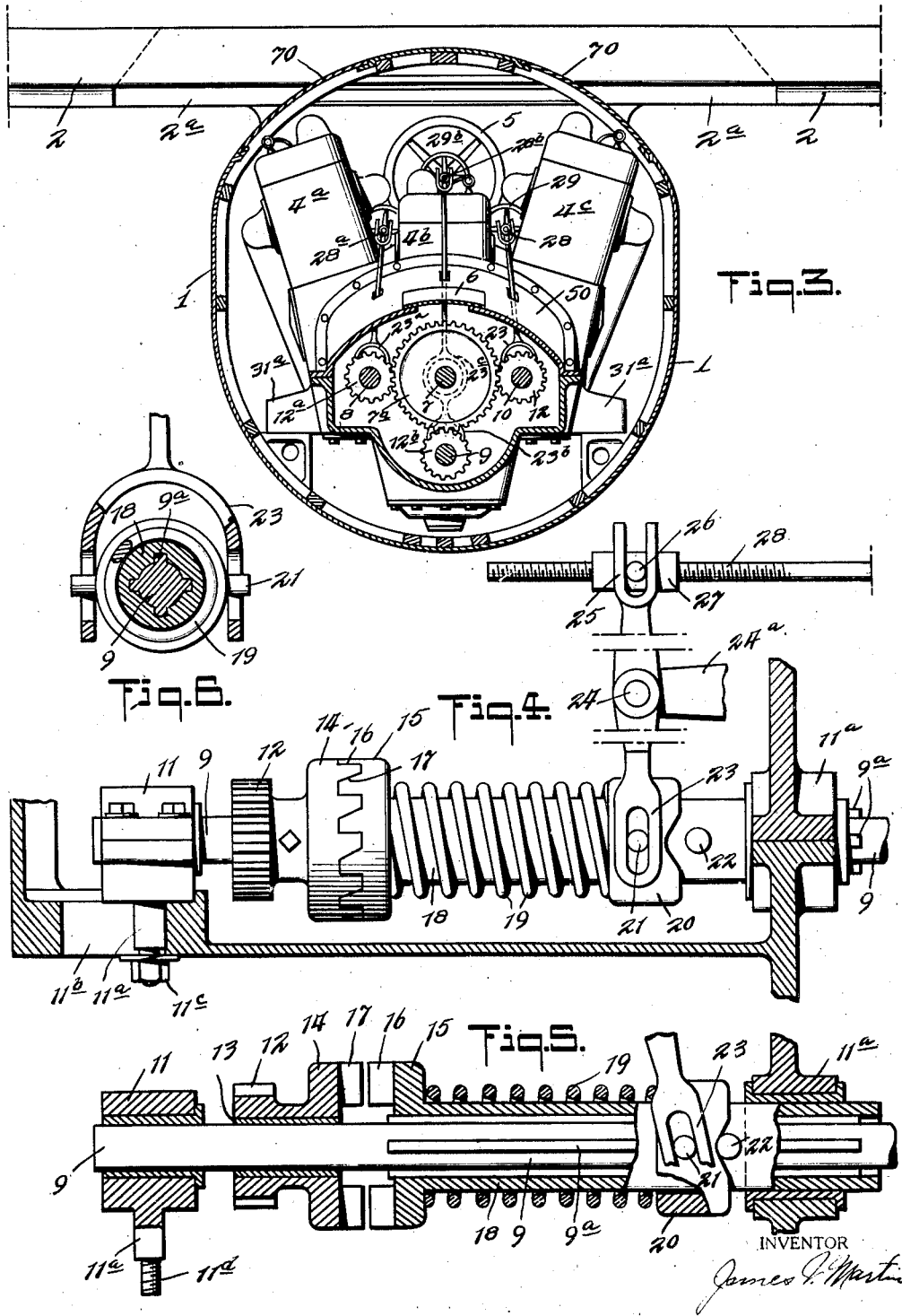

Patented July 22, 1930

1,770,937

UNITED STATES PATENT OFFICE

JAMES V. MARTIN, OF GARDEN CITY, NEW YORK

AIRCRAFT SAFETY MOTOR

Application filed July 1, 1924. Serial No. 723,540.

My invention relates to that type of aircraft propulsion which employs multiple power units to drive one or more propellers, and consists primarily in a novel arrangement of the said units mounted upon a common base, compactly streamlined and so related to the propeller drive that each unit may be separately engaged or disengaged during flight.

A further object of my invention is an arrangement of the gear and crank case such that the same may be conveniently opened for inspection and repair or replacement of certain gears.

A further object of my invention is such a disposition of the power units within a streamline body or fuselage as to afford accessibility of parts to the aircraft operator during flight.

A further object of my invention is to provide an improved automatic means of disengaging a power unit during flight.

A further object of my invention is to provide means of adjusting in a convenient manner the automatic means of disengaging a power unit from the propeller drive.

A further object of my invention is to render more compact and lighter the disengageable power units formerly disclosed in my Patent No. 1,421,803 and in my co-pending application Serial No. 522,877 and to thus adapt the safety means for use in what are termed single motored planes.

A further object of my invention is to so dispose the safety type motor relative to the essential parts of an aeroplane that a fast type plane may result which affords the pilot universal vision combined with accessibility of parts of his power plant.

Other objects of my invention will be readily apparent from the drawings and following description in which—

Figure 2 is a plan view of the safety motor portions of the fuselage and crank case housings being broken away for clearness.

Figure 3 is a front cross-sectional elevation of the safety motor located in the fuselage of a modern type aeroplane.

Figure 4 is a side elevation on larger scale disclosing the detail of the automatic and manual disengaging and engaging means employed to connect the power units with the propeller drive.

Figure 5 is a longitudinal section through the center of the mechanism disclosed in Fig. 4.

Figure 6 shows the detail in section of the driving shafts and sleeve.

Figure 1:
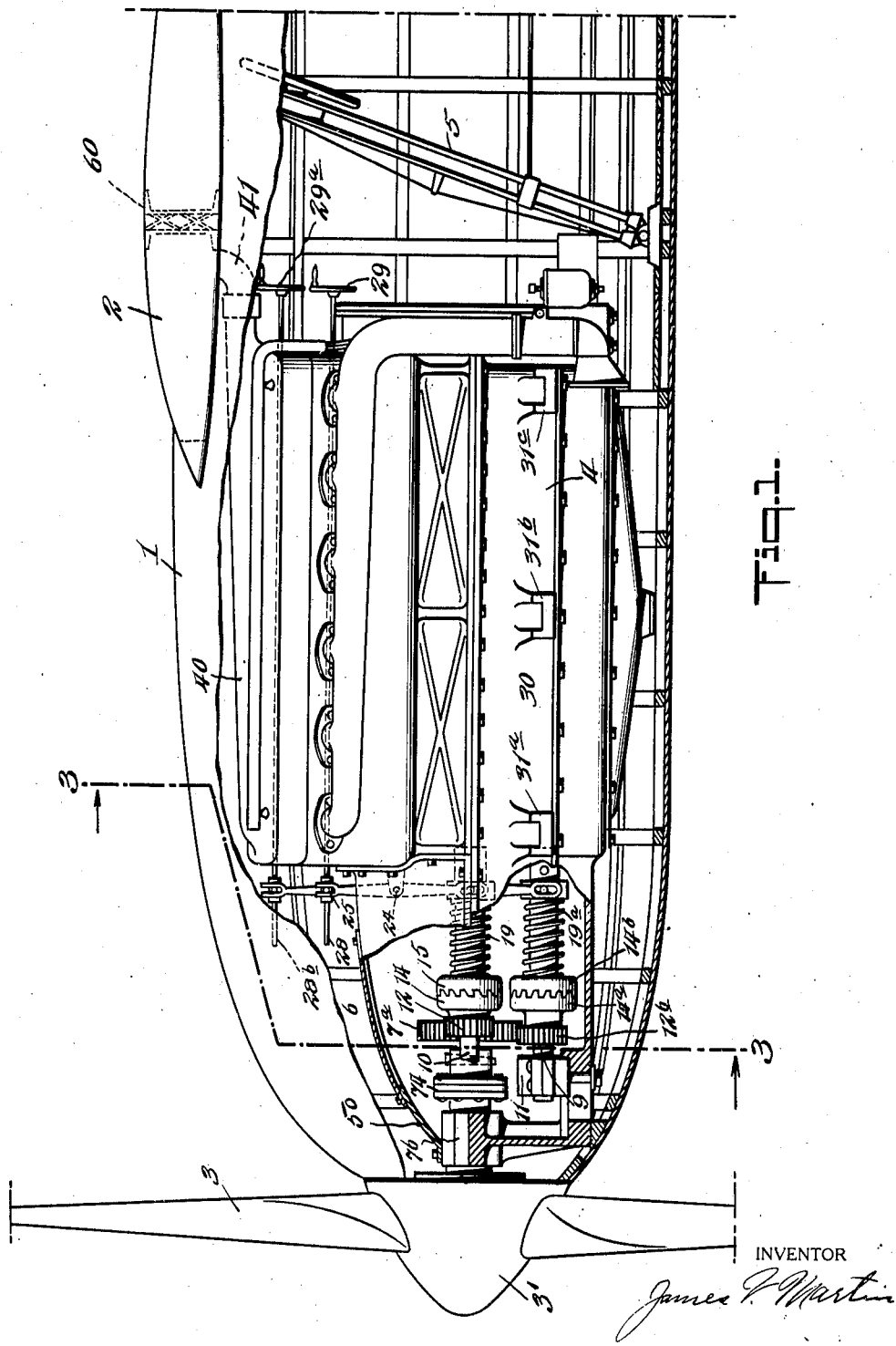
Figure 1 is a side elevation of my safety motor located in an aeroplane fuselage with portions of the fuselage broken away to disclose the motor and portions of the gear and crank case broken away to disclose the internal mechanism.

Describing the mechanism more in detail, 1 is a fuselage or streamline housing for the novel motor and although not shown in the drawing is tapered to a thin line vertically in the rear in accordance with approved streamline fashion; 2 is a modern type racing wing a portion of the surface of which is used for cooling the motor; 3 is a typical propeller protruding from a spinner 3'; 4, represents the total power plant while $4^a$, $4^b$ and $4^c$ represent the individual power units each of which is separately adapted to drive the propeller 3; 5 represents any conventional aeroplane control and $5^a$ the aeroplane pilot's seat convenient to the motor and to the vision openings $2^a$ in the aeroplane wing.

6 represents the removable crank case cover making the gears accessible without disturbing other parts of the motor. 7 is the main propeller shaft on which is secured the main driving gear $7^a$. 8, 9 and 10 are respectively the crank shafts of the individual power units journaled in bearings 11 and having freely mounted upon them small driving spur gears 12 which mesh with the larger propeller gear $7^a$. 13 is anti-friction means for small gear 12 and clutch wheel 14 which meshes under certain conditions with corresponding clutch teeth 16 of clutch ply wheel 15 which is rigid with sleeve 18, which slides along key-ways $9^a$ of shaft 9; 17 is the tapered rear face of clutch teeth adapted to force clutch fly wheel 15 out of engagement with 14 when the lag pressure in torque of shaft 9 becomes sufficient to overcome spring action 19, which can be regulated by collar 20 which is actuated manually by lever 23 on studs 21, about pivot 24 rigid with support 24ª actuated by stud 26 in forks 25, which travel with threaded part 27 on worm 28 which in turn is regulated by the pilot from cockpit by hand wheels 29 or 29ª, etc.

30 is the crank case common to all three power units, while 31ª—31ᵇ and 31ᶜ show the crank case brackets for attaching the motor firmly to the aeroplane fuselage. 40 and 41 illustrated portions of the cooling system more fully described in my copending applications for wing surface type radiators, Serial Nos. 605,411, 675,156 and 652,999; 50 is the removable cover plate on the gear end of the motor, permitting inspection and repair with the greatest ease and permitting the change of propeller gear ratio by allowing the removal of the gears and substitution of other sized gears without in the least disturbing the main bearings of any of the power units. 74 shows a coupling in the main propeller shaft to facilitate change of the large spur gear, the said coupling being flexible in type. As may be seen, the bearings for the gears such as 76, 73 and 72 for the propeller shaft and also those for the small gears are firmly supported by the main crank case casting 30.

It will be noted that an entirely new arrangement of cylinders has been effected by my invention making for more compactness, permitting a smaller fuselage and greater vision for the pilot.

60 is a metal wing spar of the open type permitting the pilot to look through it and down through the open spaces 2ª; 70 and 71 represent sliding panels in the upper portion of the fuselage, to facilitate the inspection of the motor by the pilot during flight.

In operation the power plant may be used with all three or more power units engaged until the desired altitude is reached and then one of the three units can be disengaged by the pilot turning wheels 29 or 29ª or 29ᵇ which rotates worm shafts, as 28, and moves forked lever 23 about the pivot 24 held firmly in place by bracket 24ª attached to the motor housing. Thus the pilot will be confident that the disengaged unit is in first class condition and should anything happen to either of the driving units to lessen the thrust delivery thereof the crank-shaft of the defective unit will lag relative to the unimpaired unit and the propeller drive. It will be obvious that the flat face 16 of clutch fly wheel 15 is the driving face, while the tapered portion of the clutch tooth 17 is the lag side of the tooth, so that when the power unit is driving relative to the propeller shaft the spring 19 operating through the taper 17 on back of tooth keeps the driving face in full engagement, but when the condition is reversed and the power unit lags relative to the propeller gear then the taper of back of tooth 17 will tend to disengage the lagging power unit by forcing out fly wheel 15 from engagement with clutch 14; this condition is shown in Fig. 5 although illustrating the manual action rather than the automatic.

By properly adapting the pitch of the tapered side of the clutch teeth and by regulating through hand wheel 29 the spring pressure it will be possible to determine to any degree of refinement the amount of lag pressure which should disengage a power unit. Self starters may be attached to each power unit separately or to the propeller spur gear, provision for which has been made opposite gear 12ᵇ and accessible to removable plate 6. It will also be observed that any disengaged power unit may be started when the propeller drive is operating by turning hand wheel 29 into an extreme position so that stud 26 is brought toward hand wheel 29 and stud 21 is in the opposite position from that shown in Fig. 5 this will put such friction pressure on clutch face 15 that it will start the crankshaft 9, and as soon as said crank shaft 9 comes up to speed the clutch teeth will engage as shown in Fig. 4. Thus I have in this simple mechanism an automatic means of disengaging any power unit which lags relative to the propeller drive; I can also use the same means manually operated to disengage a power unit, or if a power unit lags for a while and for any reason picks up speed again it will automatically be thrown out of gear and then reengaged without attention of the pilot. On the other hand the manual means of regulating the pressure of the clutch is such that the pilot at will can permanently keep a power unit either engaged or disengaged or start one power unit from the motion of another or from the motion of the propeller shaft itself.

Another distinct advantage of the illustrated arrangement of power units and gears resides in the ready facility by which the gear ratio of the propeller may be altered relative to the driving crankshafts, inspection of the drawings will reveal that bearings and crank case openings are arranged so that, without disturbing the power units proper, the propeller driving gears may be removed and other sizes substituted. In addition to the novel, simple and compact form and arrangement of power units herein disclosed the invention resides in the broad objects accomplished and I do not desire to be limited to the specific combination shown and described.

What I claim is:—

1. In combination with selectively engageable multiple power units adapted to drive an aeroplane propeller shaft, a common gear and crank case mounting for the bearings of said propeller shaft and power unit crankshafts and a removable cover plate intermediate said power units and the forward end of the said propeller shaft.

2. In combination with engaging means intermediate an aeroplane propeller shaft and a power unit, identical parts comprising said means operable selectively either manually or automatically, and manual means to regulate the said automatic means.

3. In combination with an aeroplane a propeller shaft, multiple power units adapted to drive the said shaft singly and jointly, automatic disengaging means intermediate each power unit and the said shaft and manual means to vary the adjustment of the said means.

4. In combination with multiple power units adapted to drive a common aeroplane propeller shaft, automatic torque pressure means of disengaging each of the said power units from the said propeller shaft and manual means convenient to the aeroplane pilot to regulate the said pressure means.

5. An aeroplane combination including a fuselage having a propeller shaft in its forward part, multiple power units to rearward thereof, a pilot's seat to rearward of the said units, selectively engageable means between the said propeller shaft and the said power units and movable portions of the external surface of the said fuselage accessible to the pilot to permit inspection, during flight, of the said power units.

6. In combination with an air craft propeller drive comprising multiple power units and a propeller shaft, torque pressure means for disengaging each power unit from the said shaft and spring pressure means for reengaging the aforesaid.

7. The combination in an aeroplane of multiple power units compactly enclosed and covered by a streamlined fuselage and selectively arranged to drive a propeller shaft, and a single means operable both automatically and manually for disengaging and reengaging each of the said units.

8. In combination with multiple power units selectively adapted to drive an aeroplane propeller shaft, two means, one automatic, of disengaging each power unit from driving connection with said shaft and manual means for adjusting the said automatic means while the propeller shaft is turning.

9. In combination with a multiple power unit drive to an aeroplane propeller shaft, a means manually and automatically operable of engaging and disengaging each power unit from the said shaft and means adjustable in flight for starting one power unit from the motion of another.

10. In combination with a multiple power unit drive to an aeroplane propeller shaft, a propeller, manual and automatic means of engaging and disengaging each power unit from the said shaft, said means located between the said propeller and the said power units, securely mounted upon a common base or crank case with the said units and enclosed within a gear case housing accessible through a cover plate in the upper portion thereof, said gear case housing being substantially integral with a continuation of the said common base or crank case.

11. In combination with a multiple power unit drive to an aircraft propeller shaft, three banks of cylinders each having a crankshaft and each said shaft having a driving connection with the said propeller shaft, the three banks of cylinders grouped on one side of the said propeller shaft so that the axis of the said propeller shaft lies between the cylinder heads and the crank case of the central bank.

12. In combination with selectively engageable clutches intermediate a propeller shaft and multiple power units and disposed at one end of the said power units, manually operable means of operating each of the said clutches independently of the others and each said means including clutch controls supported by brackets attached to the motor housing and extending from the clutch position at the propeller shaft end of the power units to the opposite end of the said units and three or more of the said units having their cylinders arranged in a letter W formation in end elevation with the center unit depressed below the heads of the other two.

13. In combination with an aircraft propeller drive, multiple power units having a crankshaft housing and having three or more cylinders arranged in a letter W formation with the central cylinder depressed below the heads of the other two and also arranged to drive selectively the said propeller through gears and clutches, and a gear case disposed at one end of the said crankshaft housing and integral therewith and inclosing the said gears and clutches and supporting the bearings for the said gear shafts in rigid alignment with each other.

14. In an aeroplane, a multiple power unit drive to a propeller shaft including three or more crank shafts and three or more cylinder banks mounted upon a common crankcase and so disposed that two of the said cylinder banks form a V with a third bank located between them and the said third bank depressed relative the other two so that a straight line drawn between the heads of the two said banks will not intersect the third said bank.

15. An aeroplane propeller drive including a propeller shaft journalled in bearings completely housed and supported by a gear case, the said gear case being integral with and disposed on one end of a motor crank case containing separate crank shafts, selective engaging and disengaging means between each said crankshaft and the said propeller shaft and the said means mounted on bearings within the said gear case.

16. In combination with a multiple power unit drive to an aircraft propeller a common crankshaft and gear housing including attachment for multiple banks of cylinders one of said banks so disposed between another two that a straight line drawn between the heads of the said two will escape touching the said intermediate bank, supports for one crankshaft for each said cylinder bank and supports and housing for a propeller shaft and gearing disposed on one end of the said crankshaft housing and providing a selective drive from each said crankshaft to the said propeller shaft.

July 1st, 1924, Washington, D. C.

JAMES V. MARTIN.